United States Patent [15] 3,650,218
Losey [45] Mar. 21, 1972

[54] AIR CONVEYOR

[72] Inventor: Wendell E. Losey, Lauderdale Lakes, Fla.

[73] Assignee: Behring Corporation, Fort Lauderdale, Fla.

[22] Filed: Mar. 9, 1970

[21] Appl. No.: 17,692

[52] U.S. Cl...........................104/23 FS, 104/134, 180/124
[51] Int. Cl.......................................................B61b 13/08
[58] Field of Search..................104/23, 23 FS, 134; 302/29, 302/31; 214/1 BE; 180/124

[56] References Cited

UNITED STATES PATENTS

| 3,513,934 | 5/1970 | Crowley | 180/124 |
| 3,540,378 | 11/1970 | Giraud | 104/23 FS |
| 3,473,910 | 10/1969 | Wilde | 302/31 |
| 3,081,886 | 3/1963 | Flexman | 104/23 FS |
| 3,242,876 | 3/1966 | Berggren | 104/134 |
| 3,498,234 | 3/1970 | Roumejon | 104/134 |

*Primary Examiner*—Arthur L. La Point
*Assistant Examiner*—D. W. Keen
*Attorney*—Settle and Oltman

[57] ABSTRACT

An air conveyor including air flotation cells spaced serially along a conveying path, a conveying pallet on the cells to be floated by air flowing from the cells, and means for supplying air to the cells to allow movement of the pallet along the conveying path. The pallet spans a plurality of cells, and preferably alternate cells communicate with different air supply ducts to provide alternate flotation systems. In a preferred embodiment, guides for guiding the movement of the pallet are included.

6 Claims, 7 Drawing Figures

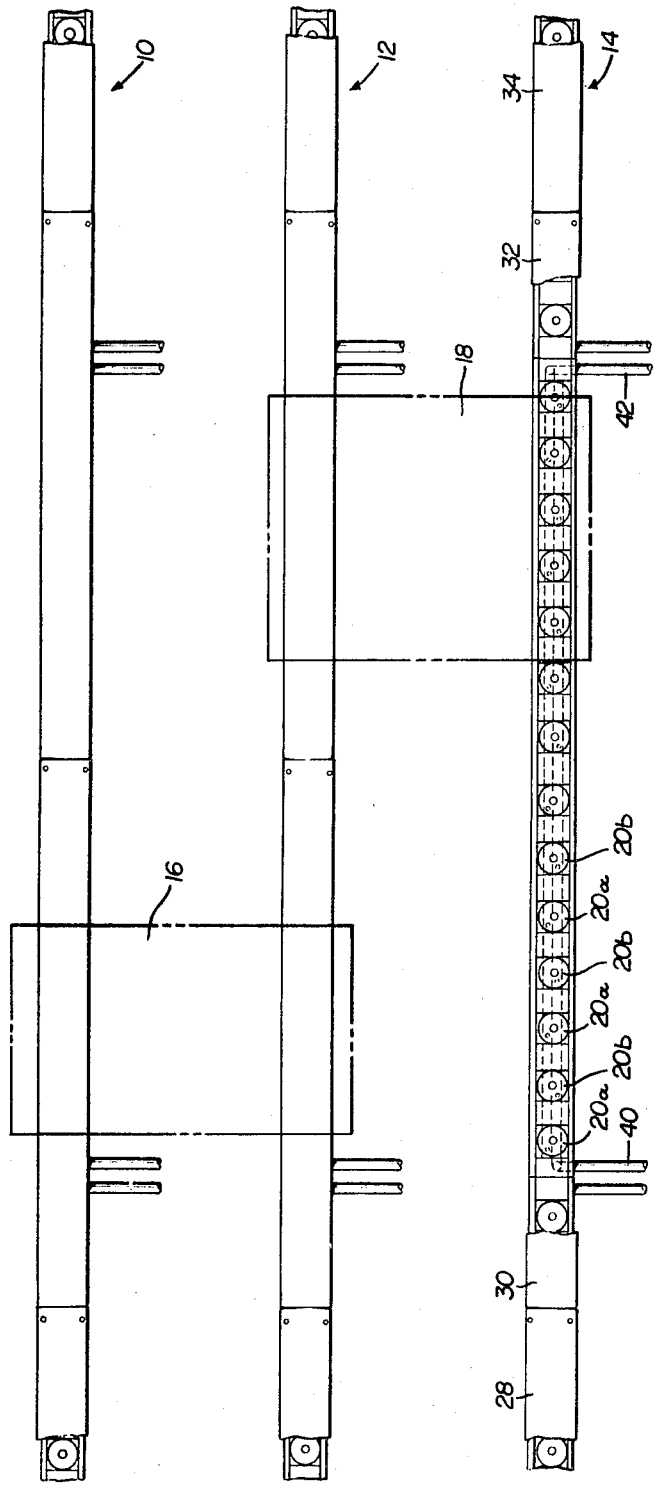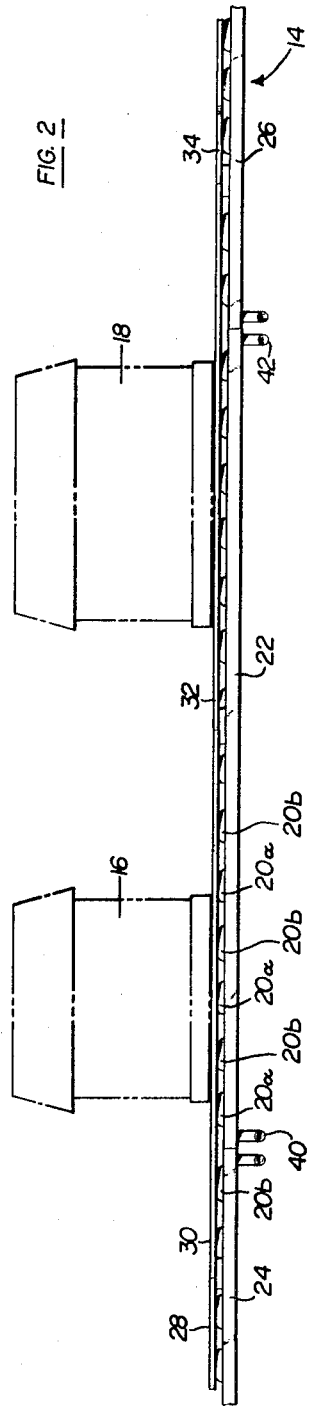
FIG.1
FIG.2
INVENTOR.
WENDELL E. LOSEY.
BY
SETTLE & OLTMAN.
ATT'YS.

PATENTED MAR 21 1972

INVENTOR.
WENDELL E. LOSEY.

BY

SETTLE & OLTMAN.
ATT'YS.

3,650,218

AIR CONVEYOR

BACKGROUND OF THE INVENTION

Conveyors for production line operations, such as chain conveyors, are relatively complicated structures involving high installation and maintenance costs. One of their serious drawbacks is that considerable friction is generated in their operation. If such a chain conveyor is installed in a floor, a substantial trench is required to provide space for return of the chain. Wheels and bearings of the conveyor require lubrication and sometimes replacement which is difficult due to the trench type installation.

SUMMARY OF THE INVENTION

The present invention provides an air flotation conveyor in which pallets linked together to provide a conveyor platform ride on a cushion of air supplied from a series of air cells spaced along a conveying path. In a preferred embodiment, the air cells are mounted in a channel, and the conveying pallets have projections which cooperate with the channel to guide the pallets as they move along the conveying path. A pin and bracket coupling may be used to link individual pallets together so that pallets can be removed from one end of the channel and returned separately to the beginning of the channel to be rerun down the conveying path. This eliminates any need for a trench for return as is required with some conveyor chains. Friction as compared to a chain conveyor is cut considerably, and the cost of installation and maintenance are reduced greatly. Wheels and bearings are eliminated, so lubrication and replacement requirements are reduced. Such an air conveyor can be run past the desired discharge point for articles being conveyed to allow for surge; that is, to allow excess articles to be temporarily stored on the extension of the conveyor. Such an extension may run outdoors if needed without special protection, whereas a chain conveyor would require rather elaborate protection. Parts can be lifted out and repaired or moved to a new location, whereas in general a chain conveyor requires pits for carrying out maintenance. Loads can be conveyed intermittently with stops at work stations.

Accordingly, it is an object of the present invention to provide an improved conveyor of the air flotation type.

Another object of the invention is to enable articles to be transported along a conveying path on pallets which are linked together and floated on air supplied from air flotation cells.

A further object of the invention is to incorporate guiding provisions into a pallet type air conveyor for guiding linked pallets along a conveying path.

A further object of the invention is to inhibit buckling of pallets of an air conveyor.

Still another object of the invention is to incorporate improved linking and guiding structures into a pallet type of air conveyor so that pallets can be easily coupled and uncoupled, pallets will move smoothly and accurately on a conveying path, and pallets can be easily removed for return and/or maintenance purposes.

Other objects of this invention will appear from the following description and appended claims, reference being had to the accompanying drawings forming a part of this specification wherein like reference characters designate corresponding parts in the several views.

ON THE DRAWINGS

FIG. 1 is a plan view of an air conveyor system in accordance with one embodiment of the invention;

FIG. 2 is an elevational view of the air conveyor system;

Figure 3:
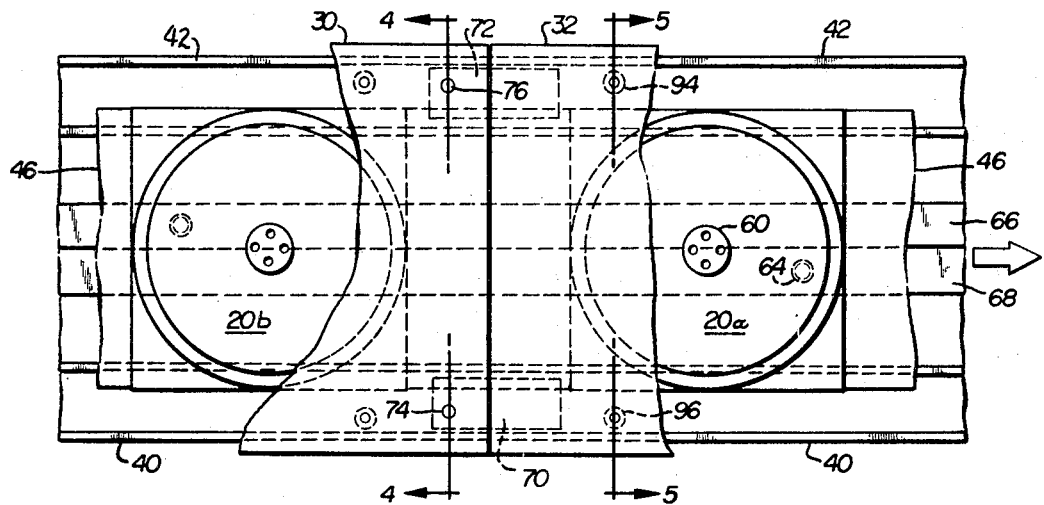
FIG. 3 is a fragmentary plan view of one section of an air conveyor with portions broken away to reveal internal construction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The air conveyor system shown in FIGS. 1 and 2 includes three individual air conveyors 10, 12 and 14 which are parallel to each other and extend along respective conveying paths in the same direction. A conveying system of this type may be used for transporting modules for modular homes along a production line, and modules 16 and 18 are shown being transported in this manner in FIGS. 1 and 2 with module 16 spanning conveyors 10 and 12 and module 18 spanning conveyors 12 and 14.

Included in each conveyor are a plurality of air flotation cells generally designated 20, but individually designated 20a or 20b. The cells 20a and 20b respectively communicate with different air supply ducts as will be explained so as to provide alternate air flotation systems. The cells 20a and 20b are mounted in an elongated channel 22, and the channel 22 is of a length to make up one conveyor section which is combined with other conveyor sections respectively including channels 24 and 26 to form a conveying path. The modules 16 and 18 or other articles are transported on pallets which are linked together to form a support, individual pallets 28, 30, 32 and 34 being shown particularly in FIG. 2. These pallets float or are supported on air issuing from the air flotation cells 20a and 20b and so can travel along the air conveyor path with very, very little friction. At the end of the conveyor path, a pallet such as 34 is simply uncoupled from the adjoining pallet 32 and is returned separate from the conveyor as by a lift or truck to the beginning of the conveying line where it is reused. Each conveyor section has its own air supply lines. For conveyor section 22, for example, air supply line 40 supplies air for the air cells 20b, and air supply line 42 supplies air for the flotation cells 20a. Since alternate flotation systems are provided, one flotation system is used as a backup for the other in case something requires shutting down the primary air system.

Figure 4:
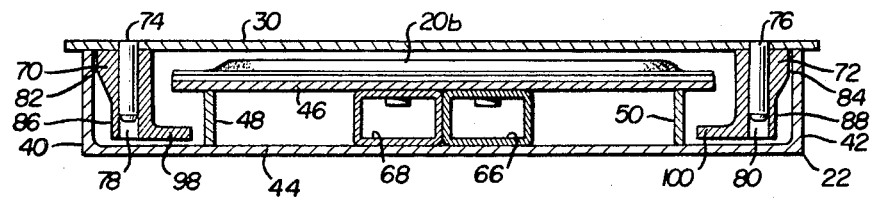
FIG. 4 is a cross-sectional view taken along line 4—4 of FIG. 3.
Figure 5:
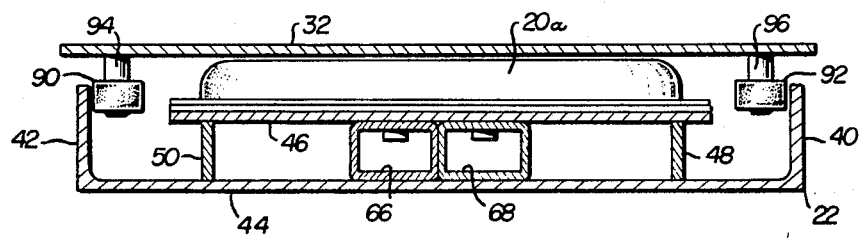
FIG. 5 is a cross-sectional view taken along line 5—5 of FIG. 3.
Figure 6:
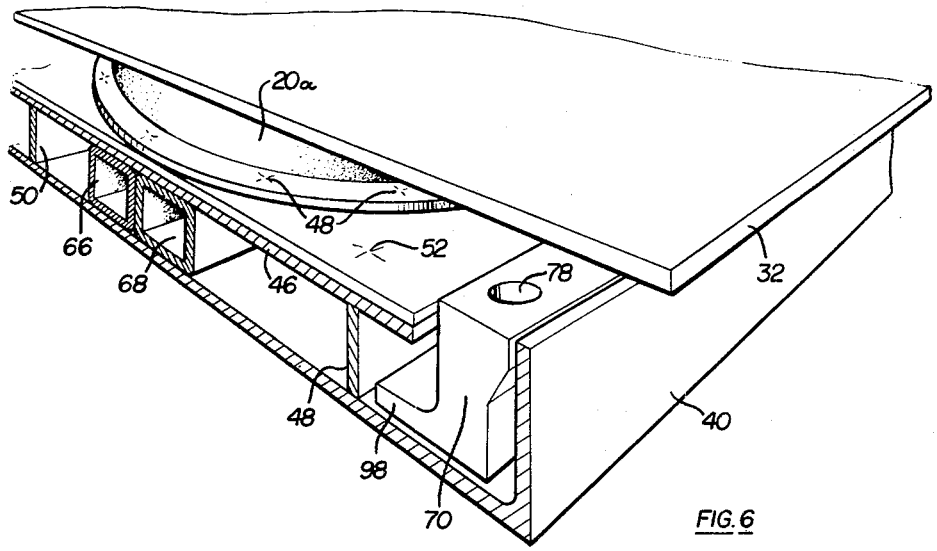
FIG. 6 is a perspective view of a portion of an air conveyor.
Figure 7:
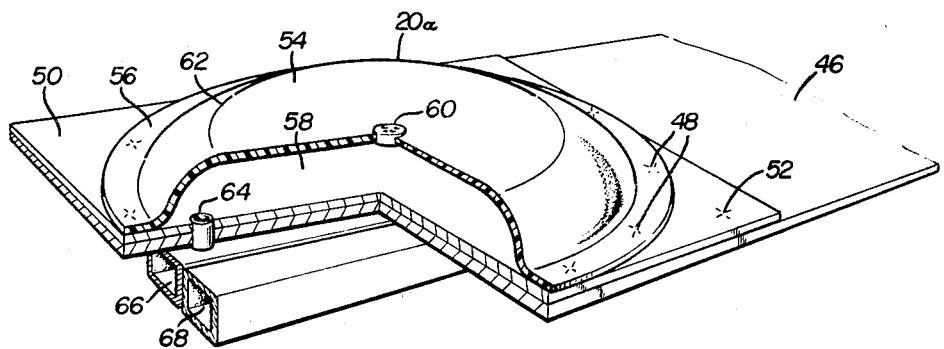
FIG. 7 is a perspective view similar to FIG. 6 but showing in particular the air flotation cell.

FIGS. 3 through 7 show fragmentary portions of the air conveyor in a manner which illustrates the internal construction. FIG. 4 shows the condition of the air conveyor with the air cells deflated, and FIG. 5 shows the condition with the air cells inflated. These sectional views are taken at different places on the conveyor as indicated by the lines 4—4 and 5—5 in FIG. 3 to illustrate different guiding provisions.

The channel 22 may be recessed in a floor such that the upper edges of the side flanges 40 and 42 project only slightly above the floor. Mounted on the base 44 of the channel is a platform 46 having supporting legs 48 and 50. The air flotation cells 20a and 20b are mounted directly on the platform 46 and are attached with suitable fasteners as at 48 in the manner shown in FIGS. 6 and 7.

The air flotation cell itself is commercially available, and so need not be described in great detail. The cell consists of a base plate 50 which is attached to the platform 46 as with fasteners or spot welding at points 52. Attached to the plate 50 is a flexible plastic disk 54 which when inflated assumes the position shown in FIG. 7. The disk 54 has an outer rim 56 which is affixed to the plate 50, and the main or central portion of the disk 54 is cup-shaped so that it may be inflated to provide an air space inside at 58. At the center of the disk 54 is an air outlet 60 which has small openings in it through which air may escape. The center of the disk where the outlet 60 is located is depressed slightly relative to a ridge 62, and the ridge 62 being raised is adapted to almost contact the pallet 32. The ridge 62 would actually touch the pallet 32, except that air escaping from the outlet 60 passes between the ridge 62 and the pallet 32 to actually float the pallet 32 slightly above ridge 62 and thus allow for movement of the pallet. Air communicates with the space 58 through an inlet tube 64 which extends through plate 50 and platform 46 in the manner shown in FIG. 7. The inlet 64 communicates with an air duct 66 which is mounted under the platform 46 and which is fed with air from the air supply line 42. The other air cells 20b communicate with a duct 68 which is fed with air from the air inlet 40.

Referring particularly to FIGS. 3, 4 and 5, it may be seen that socket bars or receptacles 70 and 72 are attached to the trailing edge of pallet 32 and extend under the leading edge of pallet 30. The leading edge of pallet 30 has pins 74 and 76 affixed to it and projecting downwardly therefrom, and the pins 74 and 76 enter into openings 78 and 80 in the socket bars 70 and 72. Thus, all that is needed to couple pallet 30 to pallet 32 is to place the pins 74 and 76 in openings 78 and 80, and the two pallets can easily be uncoupled merely by lifting the pallet 30 off the socket bars 70 and 72.

The socket bars 70 and 72 have extended vertical sides 82 and 84 which nearly touch the inner surfaces of the channel flanges 40 and 42, and thus serve to center the pallet 30 relative to the channel 22. The pallet 30 rests on the upper edges of the flanges 40 and 42 when the cells are deflated such as the deflated cell 20b shown in FIG. 4. It may be noted that the lower vertical surfaces 86 and 88 of the bars 70 and 72 are recessed inwardly so that when the air cells are inflated and the pallet 30 is raised, the surfaces 82 and 84 will be above the flanges 40 and 42 and the surfaces 86 and 88 will clear the flanges 40 and 42 by a substantial distance so as to free the bars 70 and 72 from contact with the channel flanges 40 and 42.

FIG. 5 shows such a raised pallet 32, the cell 20a being inflated as shown. It may also be seen in FIG. 5 that the trailing portion of the pallet 32 is provided with rollers 90 and 92 mounted on studs 94 and 96 which are attached to the pallet 32. The rollers 90 and 92 are spaced and arranged such that they are very close to the flanges 40 and 42 when the cells are inflated, and thus when the pallets are moving, the rollers 90 and 92 serve to guide the movement of the pallets along the conveying path. The surfaces 82 and 84 of the bars 70 and 72 are closer to the channel flanges 40 and 42 than the rollers 90 and 92 so that when the cells are deflated, the rollers are not in contact with the channel flanges.

It may be noted that the pallet 32, for example, is in the form of a load plate which is relatively long compared to its width and spans several of the cells 20a and 20b (see FIG. 2). The other pallets are also constructed to span several cells, and thus float on air cushions provided by air flowing from the outlets of several cells simultaneously. The pallets may be pushed along the conveying path by any suitable motive power, and due to the lack of substantial friction in the air flotation arrangement, it does not take great force to move relatively heavy loads along the conveying path. A suitable truck or other pusher may be used to push the pallets along the conveying path.

There could be a tendency for pallets to buckle upward as they are being pushed, so the socket bars 70 and 72 are provided with inwardly projecting flanges 98 and 100 (FIG. 4) which extend under the outer edges of the platform 46. Thus, if a given pallet rises due to buckling where pallets are linked together, the flanges 98 and 100 will stop on the platform 46 to limit the upward movement of the pallet.

Thus, it may be seen that the air conveyor of the present invention is a relatively simple device which can be installed at low cost and maintained at low cost. Friction involved in the operation of the air conveyor is at a very small minimum which reduces the horsepower needed to drive the conveyor. The conveyor can be moved if needed. It has no wheels or bearings which require lubrication, and it has no requirement for a return trench.

Having thus described my invention, I claim:

1. An air conveyor including in combination
   a. means forming a conveying path,
   b. air supply ducts leading along said path,
   c. a plurality of air flotation cells along said path, with alternating ones of said cells communicating with different ones of said ducts to provide alternate flotation systems, and
   d. pallet means spanning a plurality of the cells in one system and movable from cell to cell along said path upon inflation of said cells.

2. The air conveyor as claimed in claim 1 further including guiding means for guiding the movement of said pallet means along said path.

3. The air conveyor as claimed in claim 2 in which said guiding means comprises a channel receiving said pallet means.

4. The air conveyor as claimed in claim 3 in which said pallet means has projections extending downward therefrom engageable with opposite sides of said channel to provide guiding of said pallet means.

5. The air conveyor as claimed in claim 4 in which said projections include rolling means for rolling along said channel.

6. An air conveyor including in combination,
   a. means forming a channel,
   b. a platform supported in said channel above the bottom thereof,
   c. cell means supported on said platform providing a plurality of air flotation outlets spaced along a conveying path in said channel,
   d. pallet means movable along said path on an air cushion provided by air issuing from said outlets,
   e. means for coupling one pallet means to another,
   f. projections extending downward from said pallet means into said channel and engageable with sides of said channel to guide said pallet means and including a stop portion engageable with said platform to limit upward movement of said pallet means, and
   g. means to supply air to said cell means including first and second conduits communicating respectively with alternate cell means.

* * * * *